Sept. 18, 1951 R. L. KOEHLER ET AL 2,568,342

SIGNALING METHOD AND SYSTEM

Filed Sept 15, 1949 4 Sheets-Sheet 1

ROBERT L. KOEHLER
JAMES MILLER
INVENTORS

BY [signature]

ATTORNEY

Sept. 18, 1951 R. L. KOEHLER ET AL 2,568,342

SIGNALING METHOD AND SYSTEM

Filed Sept 15, 1949 4 Sheets-Sheet 2

ROBERT L. KOEHLER
JAMES MILLER
INVENTORS

BY Orl R. Goshaw

ATTORNEY

Sept. 18, 1951 R. L. KOEHLER ET AL 2,568,342

SIGNALING METHOD AND SYSTEM

Filed Sept 15, 1949 4 Sheets-Sheet 3

ROBERT L. KOEHLER
JAMES MILLER
INVENTORS

BY [signature]

ATTORNEY

Sept. 18, 1951 R. L. KOEHLER ET AL 2,568,342

SIGNALING METHOD AND SYSTEM

Filed Sept 15, 1949 4 Sheets-Sheet 4

ROBERT L. KOEHLER
JAMES MILLER
INVENTORS

BY Irl R. Goshaw

ATTORNEY

Patented Sept. 18, 1951

2,568,342

UNITED STATES PATENT OFFICE 2,568,342

SIGNALING METHOD AND SYSTEM

Robert L. Koehler, Venice, and James Miller, Los Angeles, Calif., assignors to Ralph D. Collins, Beverly Hills, Calif.

Application September 15, 1949, Serial No. 115,790

19 Claims. (Cl. 179—2)

This invention relates to electrical current transmission systems, and particularly to the transmission of characterized signals over existing transmission circuits for conveying intelligence, such as burglar and fire alarms, synchronization and teletype signals.

It is well-known that special circuits are now employed between industrial buildings, individual homes, telephone exchanges, police stations, and fire departments, over which signals may be transmitted to indicate some occurrence at the sending station end of the line in accordance with the type of system being used. These systems are usually too costly to be available for general use, although the need for such systems is apparent.

The present invention is directed, therefore, to a method of and system for transmitting any desired type of signal over existing telephone circuits, whereby the additional equipment needed is small in comparison with the transmission circuits, and thus, the cost per subscriber or installation is well within the reach of practically all users of telephones. The system transmits the special signal by longitudinal currents which do not interfere with the transverse or circulating currents of normal audio telephone message transmission or the low frequency ringing and dialing currents. Longitudinal currents are those which are transmitted by a pair of conductors in parallel, as in a simplex system, the return circuit being over ground. Transverse or circulating currents are those which are transmitted over a pair of conductors in series or in a loop formed thereby. When a pair of conductors are balanced, both types of currents can be transmitted thereover without interference between them. However, it is difficult to maintain this balance so that an additional feature should be added to maintain separation between the two types of currents. The present system accomplishes this result while introducing a negligible line loss of the order of .1 decibel, and is positive in operation. That is, should either side of the transmission line pair of conductors become open or grounded, or the pair become short-circuited, the longitudinal signal will still be transmitted to the receiving point because the currents may be transmitted by either or both conductors.

Furthermore, in the case of burglar or fire alarms, the circuit is preferably of the closed circuit type, so that any attempt to disconnect or tamper with the control system will of itself initiate the signal at the sending point. Thus, the system is economical by utilizing existing circuits, and is particularly reliable from several standpoints, as described hereinafter. By varying the type or form of initiated signal, the system is suitable for the transmission of teletype information, clock synchronization signals of any desired type, or code signals.

The principal object of the invention, therefore, is to facilitate the transmission of characterized signals over existing transmission circuits.

Another object of the invention is to provide an improved method of and system for interconnecting telephone subscribers with a central office over the usual type of existing telephone circuits for the purpose of signaling.

A further object of the invention is to provide an improved subscriber sending station and central office receiving station for the transmission of characterized signals, such as those reporting burglaries, fires, etc.

A still further object of the invention is to provide an improved transmission circuit over existing telephone lines.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
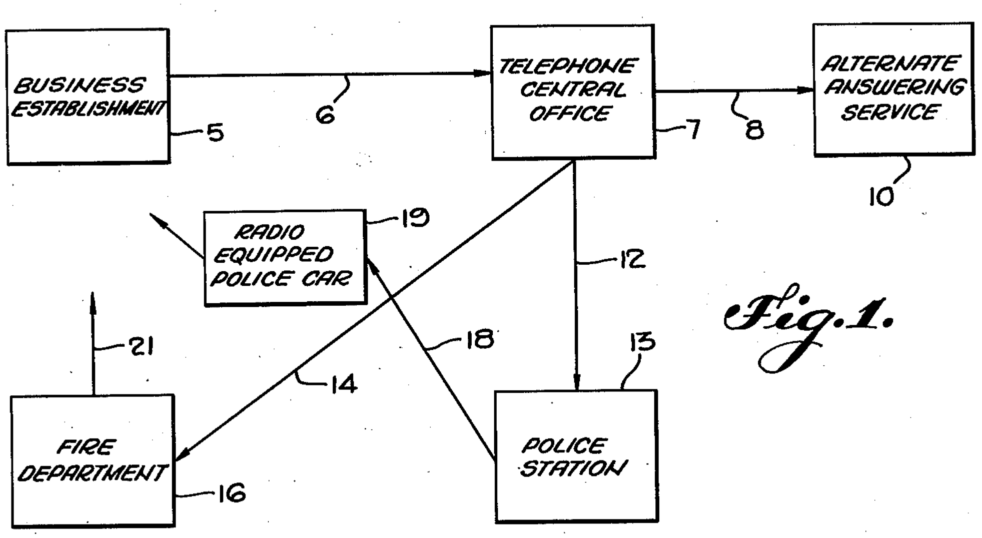
Fig. 1 is a block diagram of a system embodying the invention.

Referring now to the drawings, in which the same numerals identify like elements, and referring particularly to the single line drawing of Fig. 1, a sending point which may be a telephone subset at a business establishment or a residence, is shown at 5 connected over a conductor 6 to a telephone central office 7, the arrows showing the signal direction. If desirable, the signal received at the central office may be relayed over conductor 8 to an alternate answering service 10, such as is used by doctors when calls are to be automatically transferred to another receiver. Fig. 1 further shows the telephone central office 7 connected over a line 12 to a police station 13, and also, over a line 14 to a fire station 16. The line 18 shows an air connection between the police station 13 and a radio equipped police car 19, which may be contacted by the police station or any other sub-station of the police department. The line 21 indicates that the fire department may contact a sub-station, or even the police car, if desired. The diagram of Fig. 1, therefore, shows the general over-all transmission system, whereby a burglar or fire alarm is transmitted to a central office, which, in turn, relays the signal to the proper parties, the information being transmitted indicating the nature of the signal and the particular location of origination.

Referring now to a specific transmitting circuit at the sending or subscriber's station (see Fig. 2A), there is a signal sender circuit shown within the outline 24 and the alarm tripping or initiating device shown in outline 25, the latter being simply a switch having a normal closed contact 26, which is opened by actuation of a lever 27. Switch 26 is connected over conductors 28 to terminals A—1 and A—2, thus completing a circuit including the winding of a solenoid relay 30 having a contact 31 and a rectifier including a rectifier element 32, inductor 33, and filter condensers 34. Regular 110 volt alternating current power is supplied from a plug connection 36 over fuses 37 to the rectifier at terminals P—1 and P—2.

The other portion of the signal sender circuit includes a well-known Wien bridge oscillator with its double triode tube 36 and feedback series resistor 37, condenser 38 and a parallel resistor 39 and condenser 40. Plate potential for the tube 36 is obtained from the rectifier 32 over contact 31, when closed, and conductor 42, which also supplies plate potential to an output coupling tube 43 of the cathode follower type. The primary use of tube 43 is to connect the oscillator to the transmission line, the oscillator 36 being coupled over a condenser 44 and a resistor 45 to tube 43. The cathode heaters are shown at 41.

The other output portion of the sending circuit includes a level adjusting pad 47 and an impedance matching transformer 48 which is coupled over a balanced pair of condensers 50 to terminals T and R. The other terminal of the sending transformer 48 is connected to ground terminal G, which is connected over conductor 51 to ground 52. The terminals T and R are connected over conductors 54 to the corresponding terminals of the normal telephone pair of conductors 55, which are connected to the subscriber's telephone set 56. The line 55 is the regular type of telephone circuit pair, and is shown continuing to a manual or automatic line circuit.

Figure 2A:
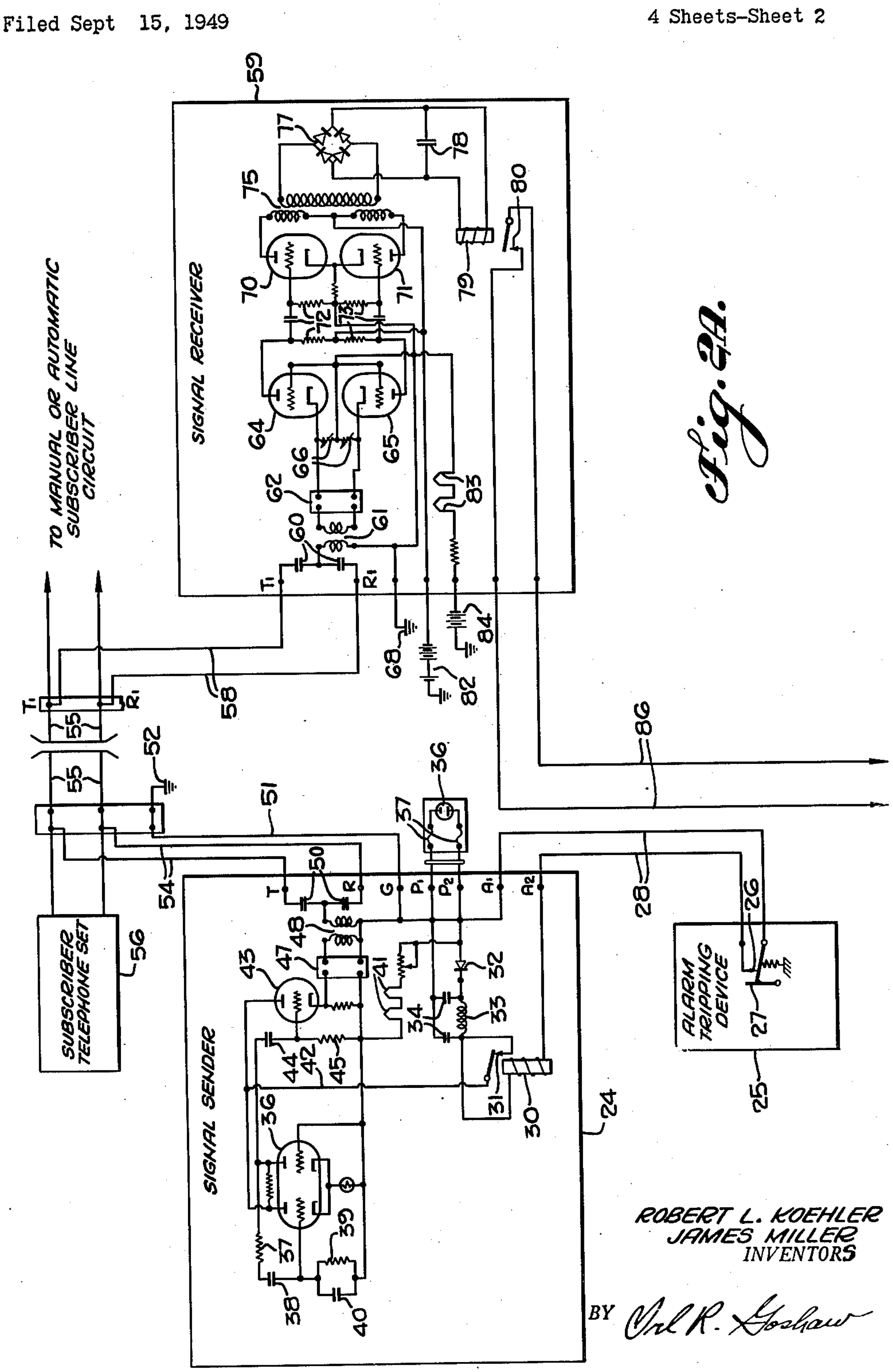
Figs. 2A and 2B are schematic circuit diagrams of a closed circuit type of system embodying the invention.

Referring now to right-hand portion of Fig. 2A, bridged across the line conductors 55 are conductors 58, which are connected to terminals T—1 and R—1 of the signal receiver shown within the outline 59. The incoming line is connected over condensers 60 to transformer 61. Through a high-pass filter 62, the signal is impressed on the cathodes of push-pull grounded grid amplifier tubes 64 and 65 across adjustable attenuators 66. The longitudinal currents are amplified in tubes 64 and 65, and then impressed on a second stage of amplification, including tubes 70 and 71 coupled to tubes 64 and 65 over condenser-resistance networks 72 and 73. The output of tubes 70 and 71 are connected over output transformer 75 to a copper oxide bridge rectifier unit 77 shunted by a condenser 78. The direct current output of unit 77 is connected to the winding of a solenoid relay 79 having a contact 80, which is normally closed when the relay winding is not energized. The remaining portion of the signal receiving circuit is similar to the sender circuit, in that the primary of the transformer 61 is grounded at 68, and plate potential is supplied from a direct current energy source 82. The cathode heaters 83 are supplied from an appropriate energy source 84.

To explain the operation of the system so far described, the oscillator 36 is normally energized and is continuously transmitting a tone over the subscriber's line 55 to the receiver 59 to supply current to the solenoid 79, which maintains its contact 80 open. These signal currents are of frequencies between 5000 and 15,000 cycles per second, so the coupling condensers, such as shown at 50 and 60, can be kept small. The signal frequency should be above 5000, so as to minimize the bridging loss to a negligible value and be above the usual pass band of the voice frequency telephone circuits and also to allow filter design, which permits the rejection of the longitudinal ringing currents which are of the order of 16–66 cycles per second. If the frequencies are above 15,000 cycles, transmission loss in ordinary exchange cables rises above a practical value.

The signals are transmitted in the form of longitudinal currents, which is an important feature not only from the standpoint of preventing interference with the transverse or circulating telephone currents, but the signal current will be transmitted in the event either one of the conductors 55 becomes open, grounded, short-circuited, or crossed with one another. Thus, false alarms are avoided in the event trouble develops on the regular telephone transmission line. The high-pass filter 62 is used to eliminate any low frequency longitudinal currents, which may be present on the line, from getting into the amplifier 64—65. Also, it is not possible for the transverse or circulating telephone currents to enter the amplifier 64—65 because they are impressed on the amplifier in phase opposition. Furthermore, the longitudinal currents will not actuate any telephone apparatus connected across the line due to the phase opposition on the currents in such bridging apparatus. Therefore, the two signals will remain separated from each other at all times.

Now, if the contact 26 is opened or the supply line to the rectifier is broken or any condition exists which prevents the tone from being transmitted, energy will be eliminated from the solenoid 79, which will allow contact 80 to close. The opening of contact 26 de-energizes solenoid 30, which breaks its contact 31 and removes plate potential from the oscillator tube 36 and tube 43 to eliminate the tone from the line. Should the power or line 54 be cut, the signal will not be transmitted. The open type of circuit, whereby the signal is initiated upon the closing of switch 25, may be used, but will not have the above safety features, which are desirable in alarm circuits.

Figure 2B:
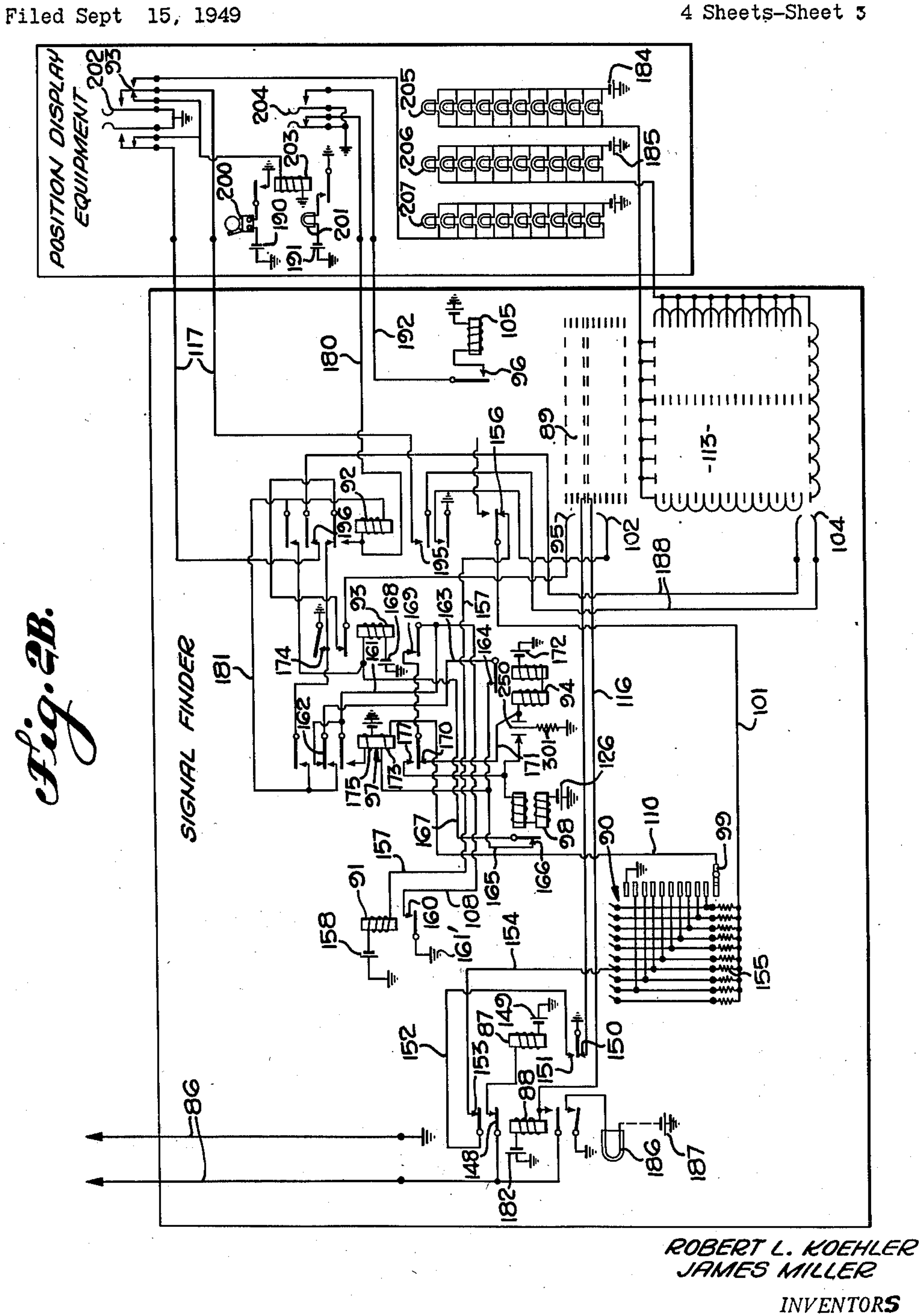

Referring now to the signal finder circuit shown in Fig. 2B, upon the closing of contact 80, the current in conductors 86 will actuate solenoid relay 87 energized over contact 148 by battery 149. Operation of relay 87 removes ground at contact 150 and makes contact 151, which places ground over conductor 152, contact 153, and conductor 154 on vertical bank 90 of the signal finder. This same ground continues through the respective vertical bank resistance 155 over conductor 101, contact 156, conductor 157, winding of relay 91, and battery 158. Energized relay 91 closes its contact 160, which connects ground over conductor 108, conductor 161, contact 162, conductor 163, contact 164, conductor 165, contact 166, conductor 167, relay 93 to battery 168. Relay 93 is thus energized, closing contact 169, which connects ground 161' over conductor 108, contact 169, contact 170, conductor 171, vertical magnet relay 94 to battery 172. The magnet 94 raises vertical wiper 99, the wipers 95 and 102, and the display wipers 104. Energization of vertical magnet 94 also opens contact 164, which opens the operating circuit above traced for relay 93, which restores relay 93, opening the circuit to magnet 94 just traced. This cycle of operations continues until the wiper 99 encounters a grounded vertical bank contact. The first vertical step operates off normal springs 96 of a release relay 105 to close an incomplete circuit.

When the vertical wiper 99 encounters a ground bank contact, a circuit is completed over conductor 110, winding 173 of relay 97, contact 166, conductor 167, and battery 168. Winding 173 is short-circuited, however, over conductor 108 and contacts 164, 162, and 160, which prevents relay 97 from operating until the end of the vertical steps. Relay 93 holds the circuit to the vertical magnet 94 closed and closes part of an incomplete circuit to relay 92 over contact 174. Operation of vertical magnet 94 opens the circuit to relay 93 at contact 164, and removes the short-circuit from winding 173 of relay 97, by removing ground over conductor 108. Relay 97 is a slow-to-operate relay, and is energized over wiper 99, conductor 110, winding 173, contact 166, relay 93, and battery 168. When relay 97 operates, it energizes its locking winding 175 over a circuit to ground over conductors 161 and 108, and closes the locking circuit to relay 93 over winding 173. This insures the complete operation of the vertical magnet 94, opens its circuit at contact 170, allowing it to restore and closes a circuit for rotary magnet 98 over battery 126, contacts 177, 169, and 160, and conductor 108. Condensers 250 are by-pass condensers for magnets 94 and 98 with resistor 301 in series therewith.

Operation of rotary magnet 98 rotates wipers 95, 102, and 104 onto the first bank contacts 89 and 113, removes the vertical wiper 99 from the vertical bank 90, and opens the locking circuit of relay 93 at contact 166. If the bank contacts to which the wipers are stepped are not associated with the marked line, ground will be present. Ground on wiper 95 prepares an incomplete circuit to operate relay 93, and relay 93, on restoring when its circuit is opened at contact 166, closes an incomplete circuit to relay 93 and removes the grounding short circuit from relay 92. As long as ground is maintained on wiper 95, the grounding short is maintained on relay 92.

The above operations repeat, stepping the wipers in a rotary motion from one to ten until a bank contact is encountered without a ground potential indicating the marked line. When the wiper 95 encounters the marked bank contact 89, there will be no ground on wiper 95 to maintain the grounding short on relay 92 after 93 restores. This circuit is from closed contact of key 204, conductor 180, winding of relay 92, conductor 181, make contacts of relay 97, and contacts 164 and 166 to battery 168. When relay 92 operates, it opens a circuit to relay 91, which restores and transfers the start conductor 101 to the next finder, operates relay 88 over wiper 102, conductor 116, and battery 182. This operation connects display lamps 205 and 206 to the display relay 203 through the display key 202, batteries 184 and 185 being the energizing batteries for the lamps 205 and 206, respectively. Lamps 205 indicate units, lamps 206 indicate tens, and lamps 207 indicate one hundreds.

When relay 91 restores, locking ground is removed from relay 97, which also restores, which leaves only relay 92 operated. When relay 88 is operated, the circuit to relay 87 is opened at contact 148 and relay 87 restores, relay 88 locks up to the signal ground, opens start conductor 154, and lights an indicating lamp 186 from battery 187. The display lamps 205 and 206 do not light at this time, due to the resistance of the relay 203.

To obtain a display of the particular sending point, display relay 203 operates from ground at relay 203 over closed contacts of key 202, conductors 117, contacts 195 and 196, conductors 188, wipers 104, display bank 113 to batteries 184 and 185. The closure of the contacts of relay 203 energizes an audible signal bell 200 from battery 190 and a visible signal lamp 201 from a battery 191. The attendant or operator now operates the display key 202, which de-energizes relay 203, thus extinguishing lamp 201 and stopping the audible signal from bell 200. Direct ground is now placed on conductors 117, which lights the tens and unit lamps 206 and 205, from batteries 184 and 185, respectively. Since the display wipers 104 are attached to the same shaft as the wiper 95, these wipers operate simultaneously and stop on corresponding contacts. For instance, if the wiper 95 stopped on number 5 contact of number 6 level, lamp number 6 of the tens lamps 206 and number 5 lamp of the unit lamp 205 will be lighted.

The attendant now consults the alarm directory and notifies the interested authorities whether fire, police, etc. of the location of the alarm as indicated in Fig. 1. The release key 204 is then operated, which operates the release magnet 105 in the finder over ground at key 204, conductor 192, contact 96, and battery at relay 105. The operating circuit for relay 92 is opened at key 204 over conductor 180, which releases the finder to normal and readies it for the next signal. The finder will not hunt for the same signal as long as relay 88 remains operated. The display key may be provided with extra contacts 193 to operate 100 group lamps as indicated at 207.

Thus, when the operator is made aware of the incoming signal by the bell 200 or visual signal lamp 201, she actuates switch 202, which will provide the subscriber's identification number on the light banks having units 205, 206, and 207. The operator, therefore, notifies the police station, fire department, in accordance with the type of signaling system being used, after which the necessary action is taken, as described in connection with Fig 1.

Figures 3, 4:
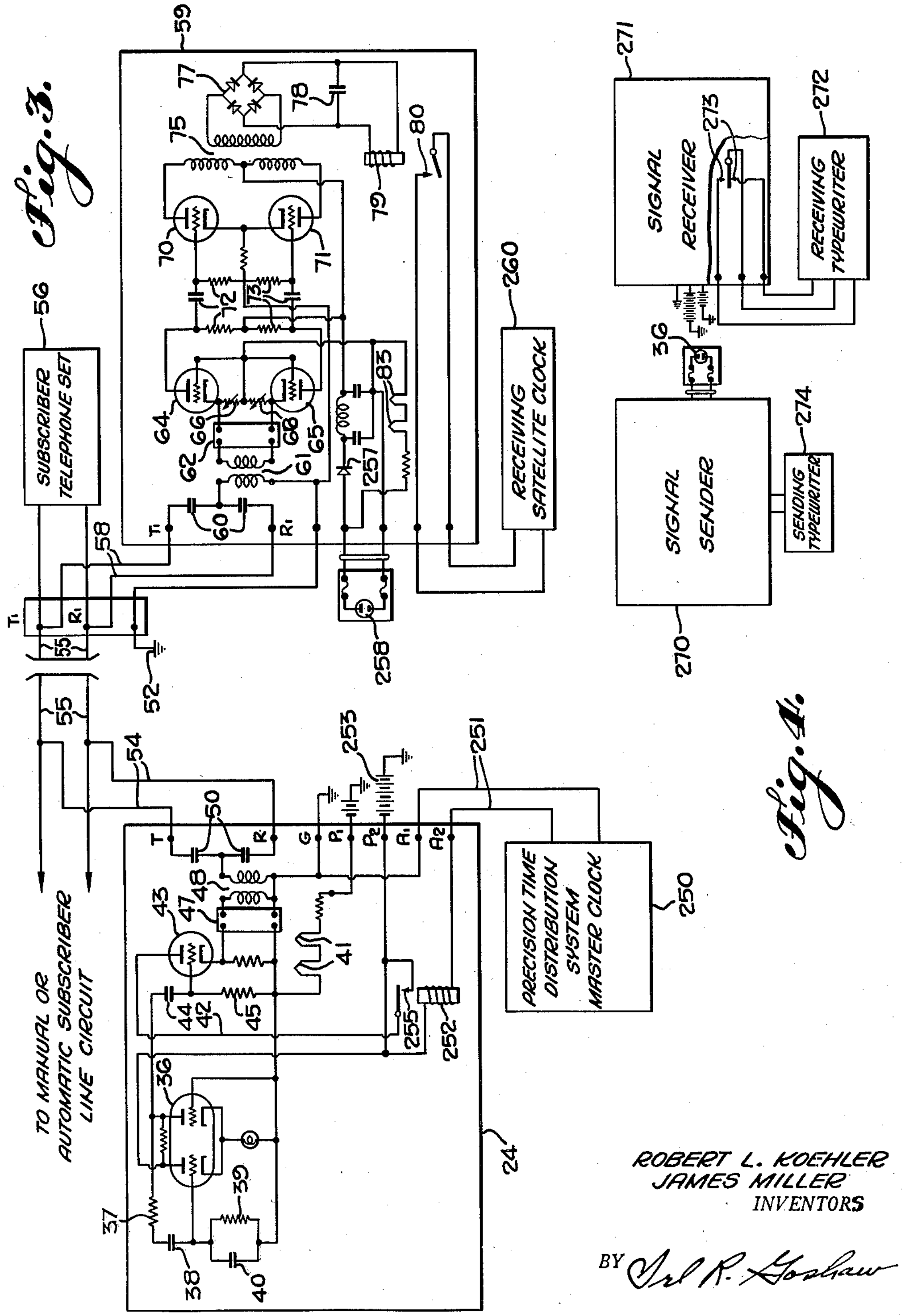
Fig. 3 is a combination diagrammatic and schematic diagram showing an open circuit modification of the invention.
Fig. 4 is a block diagram showing a modification of the system of the invention for transmitting teletype signals.

Referring now to Fig. 3, the over-all type of system shown in Fig 2A and Fig. 2B is illustrated, such a system being particularly adaptable for the transmission of synchronization signals between a master clock contacting device 250, which will close a circuit over conductors 251 connected to the winding of a solenoid relay 252 and a direct current energy supply 253. When this circuit is closed, the solenoid 252 is energized, which will close a contact 255, which will apply energy to the plate of the cathode follower tube 43. Although the oscillator 36 is energized at all times, no signal will be transmitted, except upon the closing of the circuit 251 and the consequent energization of solenoid 252. The transmitted impulse signal is transmitted in the same manner as described in connection with Fig. 2A, and is received at the sender station 59, where it will energize the relay 79 and close the contact 80, it being noted that the normal position of contact 80 is now open in Fig. 3, rather than normally closed, as shown in Fig. 2A. Another difference between the circuit of Fig. 3 and the circuit of Fig. 2A is that the sender unit 24 is energized from a direct current source, while the receiving station is energized from a rectifier unit 257 from the normal 110 volt, 60 cycle, house supply connected to plug 258. That is, the receiver circuit is energized at all times to receive the signal when transmitted.

The time pulse system may function in several ways, such as the transmitting of a pulse each hour to reset a satellite clock at 260 or it may transmit operating impulses for clock 260 at one per second to rewind the clock or at the rate of 60 per second to actuate the clock.

In Fig 4, the system is adapted for teletypewriter signal transmission, in which the sending unit is shown at 270, the receiving unit at 271 and the teletypewriter unit at 272. The sending unit 270 may be the same type shown at 24 in Fig. 2A, and the receiving unit 271 may be the same as shown at 59 in Fig. 2A. The sending typewriter unit 274 and receiving typewriter unit 272 may be of the usual standard types. The relay 79 may be of the polarized type, having double contacts 273 for operation of the typewriter, as is well-known in the art.

Figure 5:
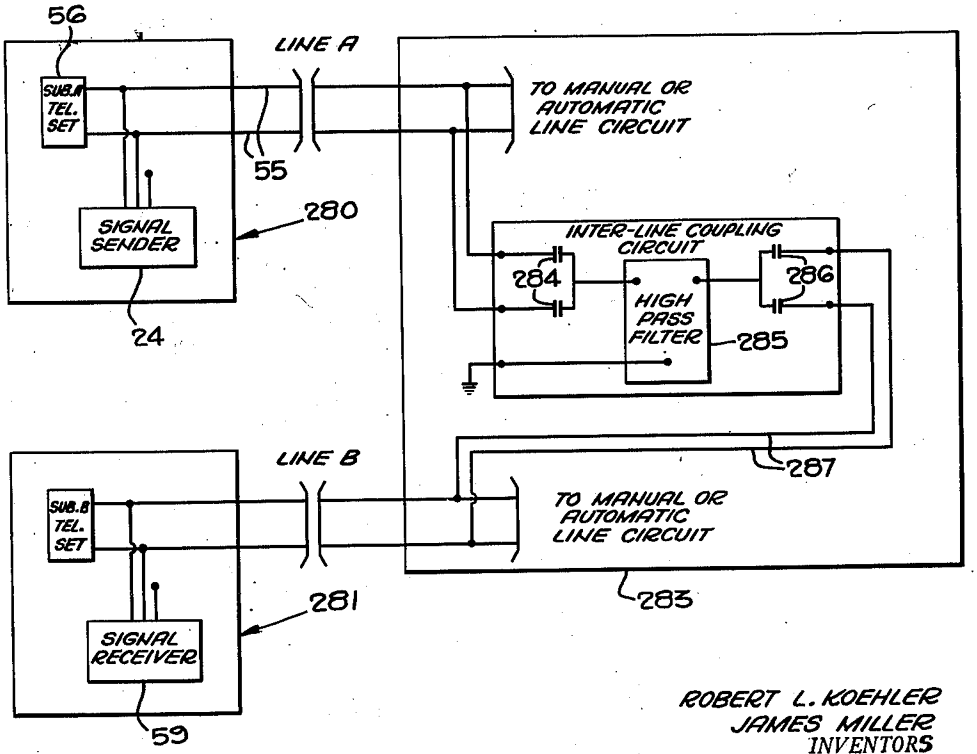
Fig. 5 is a block diagram showing a modification of the system for interconnecting individual subscribers.

If it is desired to interconnect two subscribers' stations, such as shown at 280 and 281 in Fig. 5, this may be accomplished by a unit 283, wherein the incoming line over condensers 284 is connected to the usual high-pass filter 285 and then again through condensers 286 of an outgoing transmission line 287, which, in turn, is connected to the second subscriber 281. Thus, not only may a second transmission circuit be set up between individual subscribers, but special signaling circuits between various branches of an industrial establishment, whereby coded signals or other similar types of messages may be transmitted. Such service may be provided to such subscribers at reasonable rates, inasmuch as the transmission lines are already provided and the additional use thereof does not involve the addition of any extensive amount of new apparatus or interfere with the transmission of telephone message currents.

The burglar and fire alarm system of the closed circuit type is, therefore, particularly reliable in operation, while it utilizes the minimum amount of additional apparatus to provide the alarm service. Each subscriber's station has a sender unit, and a corresponding receiver unit, as shown in Fig. 2A, is provided at the central office, the respective receiver units being connected to the telephone finder unit, which permits each source of the incoming signal to be identified as described above. That is, the contact 80 of each receiving unit operates its own relay 87, which operates its respective connections to vertical bank 90. The closed circuit system functions upon the discontinuance of the signal, and the open circuit system functions upon the reception of the signal.

Wherever low-pass filters are required to prevent the high frequency signaling currents from falsely operating any relays through the central office path, such filters may be inserted in the telephone pairs at the central office. Should two or more alarm signals arrive simultaneously, one signal will be indicated as described above, and as soon as the operator actuates release key 204, one of the waiting signals will operate bell 200 and lamp 201 and set up the new indicating circuits. The magnet 105 restores the finder shaft to its normal rest position whenever release key 204 is operated to ready the finder for the next signal. The signal finder, in addition to making the proper connections to indicate the signal source at lamps 205, 206, and 207, may also transfer this information to a code sender for further transmission to remote locations.

We claim:

1. A signal transmission system, comprising a source of continuous signal of relatively high frequency, means for discontinuing said signal, a balanced transmission line, means for impressing said signal as a simplex current on said line, a second signal source, means for impressing said signal as a loop current on said line and having a frequency different from the frequency of said continuous signal current, a signal receiving unit, means included in said unit for discriminating between said simplex currents in said line and said loop currents therein, means for initiating a signal upon the discontinuance of said simplex signal current, a telephone exchange finder operable on the reception of said last mentioned signal for indicating the reception thereof, circuit means set up by the reception of said last mentioned signal, and means for operating said circuit means for indicating the source of said signal.

2. A transmission system in accordance with claim 1, in which a plurality of sending stations are provided, together with means at said exchange for indicating the particular sending station at which the transmission of said signal has been discontinued.

3. A signaling system between a plurality of sending points and a common receiving point, comprising a plurality of transmission lines between each of said sending points and said common point, a plurality of signal generators at said sending points for generating a continuous signal, means for energizing said generators, means for connecting the output of said generators to the respective lines interconnecting said sending points with said common point, a plurality of signal receivers, contact means in each of said receivers, transmission means connected to said contact means for transmitting respective continuous signals to said common point, circuit means set up by said signals at said common point, means controlled by said receivers to indicate reception of said signals, and manual operable means for actuating said circuit means to indicate the sending point of said signal.

4. A signal system for indicating the cessation of a signal at one or more distant points at a particular point comprising a pair of conductors between each of said distant points and said particular means for impressing individual voice currents on said conductors, means for impressing a signal current on each of said pairs of conductors in parallel at each of said distant points, said signal currents having a frequency higher than the frequency of said voice currents at any particular point, means in said receivers for segregating said signal currents from said telephone voice currents, means for indicating the reception of one of said signals, means for indicating the source of said signals, circuit means for setting up said last mentioned indicating means, and manual means for actuating said last mentioned indicating means upon reception of a signal from a distant point.

5. A signaling system including a sending station and a receiving station connected by a pair of conductors, said sending station comprising means for generating a relatively high frequency tone and means for continuing and discontinuing the impression of said tone on said conductors, said receiving station comprising means for receiving said tone and means for utilizing said tone, a pair of telephone subscriber sets interconnected by said conductors, means in said sets for impressing voice currents on said conductors, means for preventing the reception of said telephone voice currents between said subscriber sets by said receiving means at said receiving station, and means for preventing said generated tone from being received in said subscriber sets.

6. A signaling system in accordance with claim 5, in which said means for utilizing said tone is a relay energized by said tone, a signal finder actuated by said relay, said finder including means for indicating actuation of said relay and the setting up of indicator circuits for indicating the source of said tone, and manual means for energizing said indicating means.

7. A signaling system in accordance with claim 5, in which said means for impressing said tone on said conductors includes a contact device operated at certain time intervals, and said means for utilizing said tone includes a relay actuated by said tone.

8. A system for transmitting over normal telephone circuits a characterized signal for indicating the source of said signal, comprising a telephone circuit pair interconnecting a pair of subscriber sets, means for impressing telephone voice currents on said circuit pair, means for generating a tone of a higher frequency than said voice currents, means for impressing said tone currents on said telephone circuit pair in parallel, means for continuing and discontinuing the impression of said tone on said pair, a signal receiver circuit, means in said receiver circuit for selecting said tone currents and rejecting said telephone voice currents on said pair, a relay operable by said tone currents, a signal finder circuit having a vertical bank magnet and a rotary bank magnet, a plurality of relays for controlling the actuation of said magnets, a plurality of indicating signal means selectively connectable through said control circuits for indicating the source of said tone, alarm means for indicating the operation of said first mentioned relay and the reception of said tone, and manual operating means for energizing said signal indicating means in accordance with the connections made by said magnets.

9. A system in accordance with claim 8, in which said generating means is an oscillator, said impressing means is a cathode follower amplifier having two output conductors, one output conductor being connected to said pair, and a pair of equal condensers for connecting said one conductor to said pair, the other output conductor being connected to ground.

10. A system in accordance with claim 8, in which said signal receiver circuit includes a pair of equal condensers, one of said condensers being connected to each conductor of said pair, and a grounded grid amplifier, the other terminals of said condensers being connected to the cathodes of said amplifier.

11. A closed circuit signaling system for signaling over a pair of conductors carrying circulating loop currents of certain frequencies, comprising a sender unit including a tone oscillator for generating currents of a frequency different from those of said loop currents, means for matching the output impedance of said oscillator to the impedance of said pair of conductors, energizing means for said oscillator, a circuit for connecting and disconnecting said energizing means with said oscillator, a control circuit for said connecting and disconnecting circuit, and a receiver unit including an amplifier and relay means actuated by the output of said amplifier.

12. A closed circuit signaling system in accordance with claim 11, in which a pair of balanced condensers is connected between one terminal of said impedance matching means and said pair of conductors, said other terminal of said impedance matching means being connected to ground, and a second pair of balanced condensers is connected between said pair of conductors and the cathodes of said amplifier, the grids of said amplifier being connected to ground.

13. A closed circuit signaling system in accordance with claim 11, in which said impedance matching means includes a cathode follower connected to said oscillator energizing means and a filter connected between said pair of conductors and the cathodes of said amplifier for passing only the tone of said oscillator.

14. A closed circuit signaling system in accordance with claim 11, in which a signal finder circuit connected to said relay means is provided, said finder circuit including telephone vertical and rotary banks for setting up indicating circuits, means for indicating the source of said tone currents connected to said banks, energizing means for said indicating means, and manual means for connecting said energizing means to certain of said indicating means set up by said finder circuit.

15. The method of transmitting a signal from a sending point to a receiving point over a telephone pair of conductors without interference with telephone message currents in said pair, comprising generating signal tone currents of a frequency above that of said message currents, impressing said tone currents on said pair of conductors in parallel, segregating said tone currents from said telephone message currents at said receiving point, utilizing said tone currents to indicate the reception thereof and to set up a circuit representing the source of said tone currents, and manually energizing said circuit to indicate said source.

16. The method of transmitting from a plurality of different points corresponding to telephone subscriber locations, alarm signals to a common receiving point, of indicating said point of initiation, and of notifying a certain location of said point of initiation, comprising continuously generating tone currents at each of said plurality of subscriber locations, said currents having a frequency above that of telephone message currents, impressing said tone currents in parallel on each pair of the telephone conductors of the subscriber sets, separating said tone currents from the telephone message currents at said common receiving point, sounding an alarm and setting up an indicator when said tone currents are discontinued, manually energizing said indicator to indicate the particular source at which said longitudinal currents were discontinued, and transmitting knowledge of said source to predetermined locations.

17. A system for simultaneously transmitting signal currents and telephone message currents without mutual interference over a pair of conductors between two points, comprising a transmission line loop formed by said conductors, means for generating and transmitting telephone message currents in said loop, means for generating continuous tone currents having a frequency above that of said message currents, means connected in parallel for impressing said signal currents on said conductors at one end of said pair, filter means at the other end of said pair for receiving only said signal currents, a relay having contacts held open by the reception of said signal currents, and means for closing said contacts upon the discontinuance of said signal currents.

18. A system for transmitting a signal from a sending point to a receiving point over a telephone pair of conductors without interference with telephone message currents in said pair, comprising means for generating signal tone currents of frequencies different from those of said message currents, means connected in parallel for impressing said tone currents on said pair of conductors, means for segregating said tone currents from said telephone message currents at said receiving point, means for utilizing said signal tone currents at said receiving point, and means for indicating the source of said signal tone currents at said receiving point.

19. A system for signaling over a pair of conductors carrying circulating currents of certain frequencies, comprising a sender unit including a current generator for generating currents having frequencies different from those of said circulating currents, means for continuing and discontinuing the impression of said generated currents on said pair of conductors, a receiver unit for receiving said generated currents, a subscriber's set connected to said pair of conductors, means for segregating said generated currents from said circulating currents at said receiver unit, and means for utilizing said generated currents at said receiver unit.

ROBERT L. KOEHLER.
JAMES MILLER.

REFERENCES CITED

The following references are of record in the file of this patent:

UNITED STATES PATENTS

| Number | Name | Date |
|---|---|---|
| 1,691,962 | Demarest | Nov. 20, 1928 |
| 2,052,055 | Peterson | Aug. 25, 1936 |
| 2,279,697 | Terroni | Apr. 14, 1942 |